Feb. 21, 1928.
C. B. MILLS
1,659,828
ILLUMINATING DEVICE FOR RUDDER ANGLE INDICATORS
Filed Sept. 14, 1921
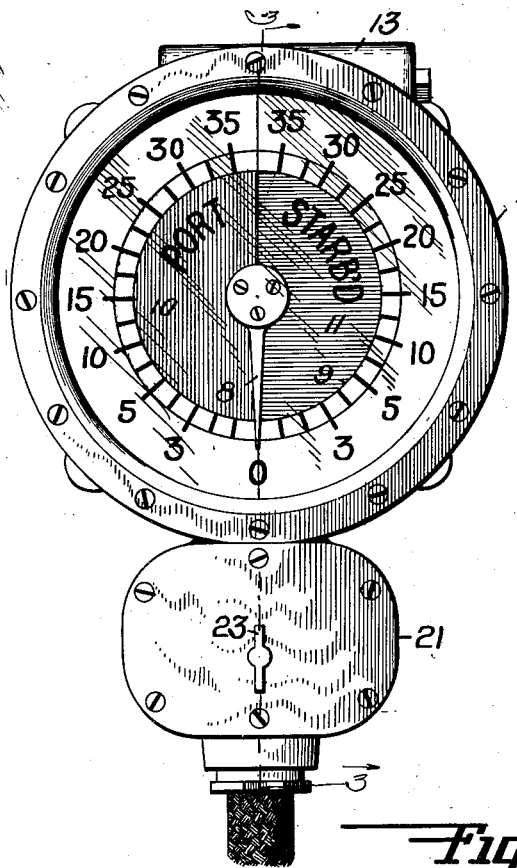
Fig.1.
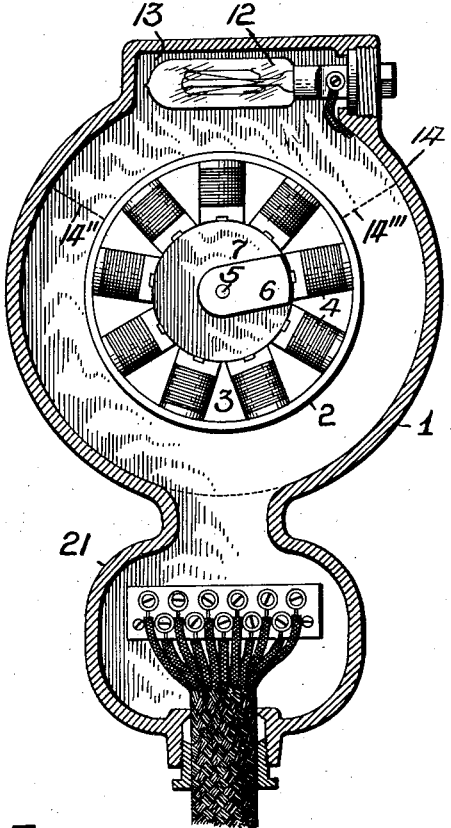
Fig.2.
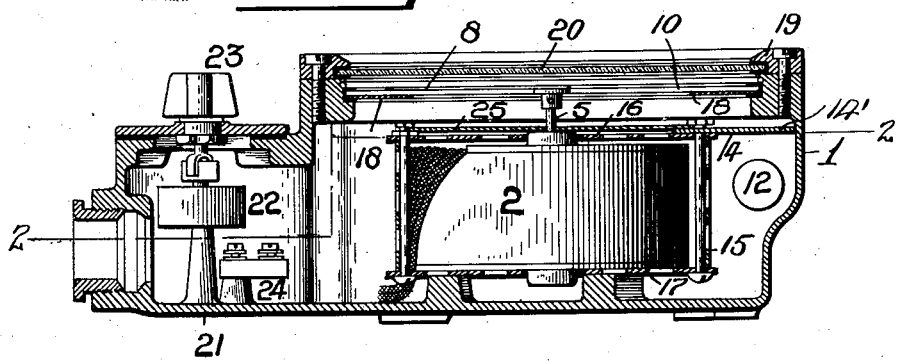
Fig.3.
Fig.4.
Inventor
CHESTER B. MILLS.
By his Attorney
Herbert H. Thompson Patented Feb. 21, 1928.

1,659,828

UNITED STATES PATENT OFFICE.

CHESTER B. MILLS, OF BROOKLYN, NEW YORK, ASSIGNOR TO THE SPERRY GYRO-SCOPE COMPANY, OF BROOKLYN, NEW YORK, A CORPORATION OF NEW YORK.

ILLUMINATING DEVICE FOR RUDDER-ANGLE INDICATORS.

Application filed September 14, 1921. Serial No. 500,599.

This invention relates to an indicating instrument having a scale in combination with a light source for illuminating the scale, and has for its object the provision of means for insuring a fairly uniform illumination of all parts of the scale regardless of their distance from the source.

Other objects and advantages will become apparent as the description of the invention is hereinafter developed.

Referring to the drawings wherein I have shown what I now consider to be the preferred form of my invention:

Fig. 1 is a front elevation of the indicating instrument.

Fig. 2 is a view taken on the line 2—2 of Fig. 3 showing certain of the parts within the casing of the indicating instrument.

Fig. 3 is a vertical sectional view through the indicating instrument on the line 3—3 of Fig. 1, certain parts appearing in elevation.

Fig. 4 is a view of a detail.

In Figs. 1, 2 and 3 is shown an instrument adapted to be placed adjacent the helmsman or at any other desired point for indicating the rudder's position. This instrument comprises a casing 1 within which is mounted a second casing or housing 2 which encloses a repeater motor 3. Said motor comprises a plurality of field poles 4 and a movable armature, the position of which depends upon the particular poles energized. The motor shown is of the type disclosed in the application of Elmer A. Sperry, Jr., Serial No. 427,997, filed Dec. 3, 1920, for "repeater motors", the only difference being that said motor is herein shown provided with nine field poles instead of five. The armature of the motor as will be readily understood comprises a pair of elements secured to opposite ends of a shaft 5 and extending in opposite directions one of said elements being shown at 6. Said elements are positioned outside the opposite ends of an annular housing 7 of non-magnetic material which encloses a suitable coil for polarizing the armature. With the motor shown, by varying the energization of the field poles in sets of four and five, thirty six steps per revolution of the motor armature may be obtained. To minimize the leakage of magnetic flux from the motor, the latter may be surrounded by a cylindrical metal housing 15 having a top 16 and bottom 17. The top and bottom of said housing may be provided with apertures, as shown, for ventilating purposes.

Rotatable with the shaft 5 of the armature 6 is a pointer 8 adapted to be read in conjunction with a scale 9. The latter is formed in two sections, each depicted in any suitable manner on a corresponding semicircular glass plate mounted in casing 1 just beneath the indicator 8. Said semicircular plates are designated 10 and 11 respectively and may be of different colors, so that it may be readily determined whether the rudder is moved to the port or starboard or to the right or left. If desired, one of said plates may have the word Port marked thereon, and the other the word Starboard. When the rudder is in its neutral position the pointer 8 lies over the dividing line between plates 10 and 11, which corresponds with the zero point of scale 9. Each section of said scale is provided with corresponding graduations, by which the angular movement of the rudder to either side of its neutral position may be indicated. In the example shown, each section of said scale is graduated to indicate the angular position of the rudder up to thirty-five degrees, seventeen graduations being provided on each side of zero. As it is desirable to ascertain the position of the rudder with greater accuracy when the rudder is positioned at small angles with respect to its neutral position, the graduations from zero to five degrees are in units of one degree, while the indications from five to thirty-five degrees, where less accuracy is required, are in units of two and one half degrees. Means (not shown) may be provided for causing each step of the repeater motor and pointer 8 to correspond to one degree of turn of the rudder for movement of the latter between zero and five degrees and for causing each step of said motor and pointer to correspond to two and one-half degrees of turn of the rudder for movements of the latter between five and thirty-five degrees.

I have provided means for illuminating the scale 9 and other markings on the plates 10 and 11. This means may take the form of an electric incandescent lamp 12 positioned beneath said plates in an extension 13 of casing 1. It will be seen that the lamp will tend to illuminate the adjacent portion of scale 9 and plates 10 and 11 more brightly than the more remote portions thereof. To render the illumination of said scale and plates more even and uniform a strip 14 of celluloid or other suitable light absorbing translucent material may be interposed between lamp 12 and the adjacent portions of said plates, as shown. This strip may be formed with a portion 14' that fits within extension 13 of casing 1 and with curved wing portions 14'', 14''', which cover a portion of the annular passage between casing 15 and casing 1, as indicated in dotted lines in Fig. 2. Since the brilliancy of the light decreases with increasing distance from the lamp 12, the wings 14'', 14''' are shown decreasing in thickness from portion 14' to the ends of said wings, as shown in Fig. 4. The portion 14' may be of uniform thickness since it lies immediately beneath the lamp and the length thereof is not much greater than that of said lamp. Strip 14 acts not only to absorb part of the light from lamp 12, but the under surface of said strip serves to reflect downwardly part of the light from said lamp. The interior of casing 1 and the exterior of housing 15 are provided with light diffusing surfaces, which may consist of any light paint so that light from lamp 12 may be reflected from the floor and walls of casing 1 and the exterior of housing 15 completely around scale 9. It has been found desirable to place an annular strip 18 of celluloid below plates 10 and 11 to modify the brightness of the light falling upon scale 9. Also the under surface of said strip 18 serves to reflect light down upon the top of a disk 25 of celluloid, or other suitable material which is positioned above the top of housing 15, the light being then reflected by disk 25 out through the hole in annular strip 18 thus illuminating the part of plates 10 and 11 that is surrounded by scale 9. If desired, disk 25 may be omitted and the top 16 of housing 15 painted white to reflect light. It will be seen from the above described construction that a substantially uniform illumination of scale 9 and plates 10 and 11 is obtained. A bezel 19 serves to clamp a glass plate 20 to the front of casing 1, so that plates 10 and 11 and pointer 8 are protected from dirt and moisture.

Casing 1 is shown provided with another extension 21 within which is mounted a switch 22 of conventional design for making and breaking a circuit through lamp 12. Said switch is provided with a button 23 on the outside of extension 21 for turning said switch. Within said extension 21 may also be located a terminal block 24 by means of which connections may be made between the repeater motor and the transmitting instrument.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention what I claim and desire to secure by Letters Patent is:

1. An indicating instrument comprising a casing having a scale, a relatively movable reference member, a repeater motor within said casing for causing relative movement between said scale and said member, a lamp within said casing for illuminating said scale and a member of translucent material between said lamp and said scale, the thickness of at least a portion of said member decreasing with the distance from said lamp.

2. An indicating instrument comprising a casing having a scale, a relatively movable reference member, a second casing contained within the first mentioned casing, a repeater motor within said second casing for causing relative movement between said scale and said member, a lamp interposed between said casings for illuminating said scale and light absorbing material interposed between said lamp and a portion of said scale, at least a portion of the walls of said casings and the floor of the first mentioned casing being provided with light reflecting surfaces.

3. An indicating instrument comprising a casing, a pair of semi-circular differently colored glass plates secured to said casing, said plates having a scale, a pointer movable with respect to said plates for cooperating with said scale, a second casing within the first mentioned casing, a repeater motor within said second casing for moving said pointer, a lamp within said first casing for illuminating said plates, a ring of translucent material between said scale and said lamp, and an additional member of translucent material between said lamp and the adjacent portion of said scale, the walls of said casings and the floor of the first mentioned casing being provided with light reflecting means.

4. An indicating instrument comprising a casing, a pair of semi-circular differently colored glass plates secured to said casing, said plates having a scale, a pointer movable with respect to said plates for cooperating with said scale, a second casing within the first mentioned casing, a repeater motor within said second casing for moving said pointer, a lamp within said first casing for illuminating said plates, a ring of celluloid between said lamp and said scale, an additional member of celluloid between said lamp and the adjacent portion of said scale, a light reflecting means on the walls of said casings, the floor of the first mentioned casing, and the top of said second casing.

5. An indicating instrument comprising a casing, a pair of semi-circular, differently colored glass plates secured to said casing, said plates having a scale, the scale on one plate indicating oppositely to the scale on the other plate, a pointer movable with respect to said plates for cooperating with said scale, and a lamp within said casing for illuminating said plates.

In testimony whereof I have affixed my signature.

CHESTER B. MILLS.